United States Patent
Morse et al.

(10) Patent No.: US 10,284,790 B1
(45) Date of Patent: May 7, 2019

(54) ENCODING SEGMENT BOUNDARY INFORMATION OF A VIDEO FOR IMPROVED VIDEO PROCESSING

(71) Applicant: Google Inc., Mountain View, CA (US)

(72) Inventors: Reed Morse, Palo Alto, CA (US); David Matthew Patierno, San Francisco, CA (US); Jason Toff, New York, NY (US); John Gregg, San Francisco, CA (US)

(73) Assignee: Google LLC, Mountain View, CA (US)

( * ) Notice: Subject to any disclaimer, the term of this patent is extended or adjusted under 35 U.S.C. 154(b) by 160 days.

(21) Appl. No.: 14/667,057

(22) Filed: Mar. 24, 2015

Related U.S. Application Data

(60) Provisional application No. 61/971,927, filed on Mar. 28, 2014.

(51) Int. Cl.
*H04N 7/173*        (2011.01)
*H04N 5/265*        (2006.01)
*H04N 19/85*        (2014.01)
*H04N 19/87*        (2014.01)
*G06T 1/00*         (2006.01)

(52) U.S. Cl.
CPC ........... *H04N 5/265* (2013.01); *G06T 1/0028* (2013.01); *H04N 19/85* (2014.11); *H04N 19/87* (2014.11)

(58) Field of Classification Search
CPC ......... H04N 1/4092; H04N 1/58; H04N 5/142
See application file for complete search history.

(56) References Cited

U.S. PATENT DOCUMENTS

| | | | |
|---|---|---|---|
| 5,537,530 A * | 7/1996 | Edgar ............... | G06F 17/30843 375/E7.183 |
| 8,537,175 B1 * | 9/2013 | Toderici ........................ | 345/591 |
| 2006/0114994 A1 * | 6/2006 | Silverstein ............... | H04N 5/21 375/240.12 |
| 2009/0100339 A1 * | 4/2009 | Wharton-Ali ........ | G11B 27/105 715/720 |
| 2012/0063635 A1 * | 3/2012 | Matsushita ........... | G06T 1/0028 382/100 |

* cited by examiner

*Primary Examiner* — Olugbenga O Idowu
(74) *Attorney, Agent, or Firm* — Lowenstein Sandler LLP

(57) ABSTRACT

A method for encoding segment boundary information of a video for improved video processing is disclosed. The method includes identifying, by a processing device, boundary data corresponding to segments of a content item, encoding the boundary data as part of the content item, and transmitting the content item with the encoded boundary data to a server.

25 Claims, 5 Drawing Sheets

US 10,284,790 B1

ENCODING SEGMENT BOUNDARY INFORMATION OF A VIDEO FOR IMPROVED VIDEO PROCESSING

PRIORITY CLAIM TO RELATED APPLICATION

This application claims the benefit under 35 U.S.C. § 119(e) of U.S. Patent Provisional Application No. 61/971,927, filed on Mar. 28, 2014, the entirety of which is incorporation herein by reference.

TECHNICAL FIELD

This disclosure relates to the field of content sharing platforms and, in particular, to encoding segment boundary information of a video for improved video processing.

BACKGROUND

On the Internet, social networks allow users to connect to and share information with each other. Many social networks include a content sharing aspect that allows users to upload, view, and share content, such as video content, image content, audio content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, and/or listen to digital music).

Many users upload videos to social networks. Often, these videos are low-quality. This could mean any of the following: that the resolution is poor, the ISO is wrong (hence images are grainy or difficult to see), white balance is incorrect, colors are washed out or poorly balanced, or the video is shaky. For this reason, social networks may perform various video enhancements to a video after the video is uploaded to the social network. Video enhancement algorithms applied by social networks may perform badly on a video with multiple scenes. For example, a stabilizer algorithm may detect a boundary between two segments ("clips") of the video as an "unstable event" and attempt to stabilize it, when, in fact, the stabilizer should leave the clip boundary alone. Similarly, two scenes may have very different color profiles in a video. In this case, a color correction algorithm may try to even the color balance between scenes, when such an action is not actually appropriate.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for encoding segment boundary information of a video for improved video processing is disclosed. The method includes identifying, by a processing device, boundary data corresponding to segments of a content item, encoding the boundary data as part of the content item, and transmitting the content item with the encoded boundary data to a server.

In one implementation, the encoding the boundary data further includes generating, for each pair of the segments, a single frame between the pair of segments, the single frame comprising a marker that indicates that the single frame is on a segment boundary. Furthermore, the encoding the boundary data may include, for each frame of the content item at the beginning of a segment boundary, inserting a pattern on pixels of the frame to indicate a start of the segment boundary.

In another implementation, the encoding the boundary data includes, for each frame of the content item at the beginning of a segment boundary, inserting a color shift on pixels of the frame to indicate a start of the segment boundary. In addition, the encoding the boundary data may include, for each frame of the content item at the beginning of a segment boundary, inserting a watermark on pixels of the frame to indicate a start of the segment boundary.

In other implementations, the encoding the boundary data further includes adding a tone in an audio track of the content item at the segment boundary. Furthermore, the encoding the boundary data may include adding a tone pattern in an audio track of the content item at the beginning of the content item, the tone pattern to indicate locations of the segments in the content item. In one implementation, the server receives the content item with the encoded boundary data and processes the encoded boundary data to utilize in content item enhancements applied to the content item. In a further implementation, the encoding the boundary data may also include altering pixels of a frame at the beginning of the content item, the altered pixels to indicate locations of the segments in the content item. In addition, the encoding the boundary data may include incorporating timestamps representing the boundary data in a container file of the content item.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Figure 1:
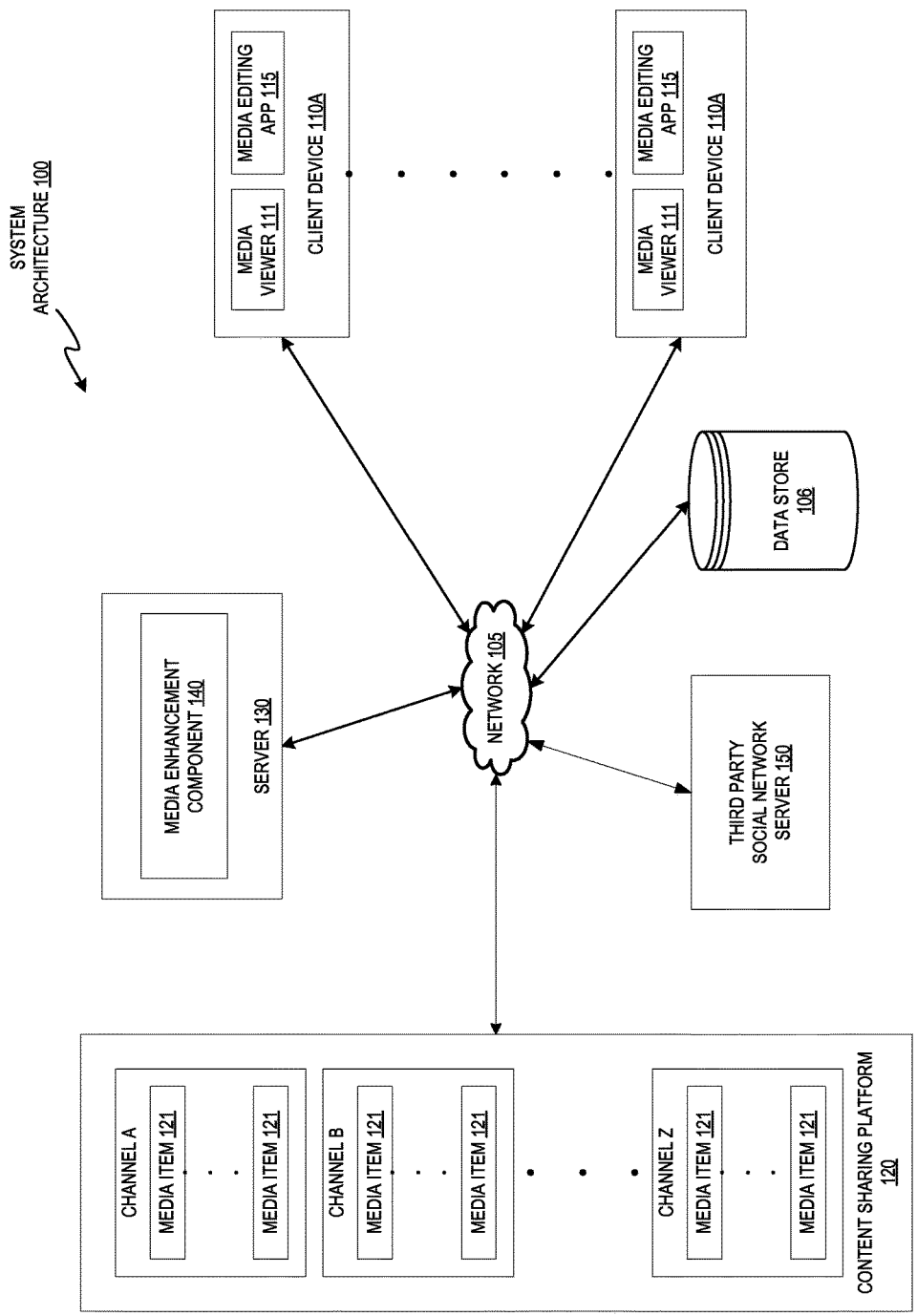
FIG. 1 illustrates an example system architecture, in accordance with one implementation of the disclosure.

Implementations are described for encoding segment boundary information of a video for improved video processing. A media enhancement component may apply one or more enhancements to media items of content sharing platform. For example, video recorded on a mobile device is often of low quality. This could mean that the resolution is poor, the ISO (International Organization for Standardization) is wrong (hence images are grainy or difficult to see), white balance is incorrect, colors are washed out or poorly balanced, or the video is shaky, to name a few examples. For this reason, the media enhancement component may perform various video enhancements to a video after the video is uploaded to the content sharing platform.

A media editing application of a client device allows users to record, edit, upload, and share media items at the client device. Some videos which are uploaded to the content sharing platform from the media editing application may have more than one scene. For example, there may be a shot of a dog, then a shot of a stick, then a shot of the dog fetching the stick. This video has three scenes. Implementations of the disclosure may refer to each scene as a "segment" or a "clip."

The enhancement processing performed by a media enhancement component may perform badly on such a video with multiple scenes. For example, a stabilizer algorithm applied by media enhancement component may detect a boundary between two segments as an "unstable event" and attempt to stabilize it, when in fact the stabilizer should leave the segment boundary alone. Similarly, two segments may have very different color profiles. In this case, a color correction algorithm applied by media enhancement component may try to even the color balance between segments, when such an action is not actually appropriate.

Implementations of the disclosure improve the performance of server-side enhancement processing on videos received from a client device. When video is edited at the client device, segment boundary data is noted. The segment boundary data may include timestamp(s) within the video where a segment boundary occurs. This data is then packaged and transmitted to the content sharing platform, before, during, and/or after the video is uploaded. The segment boundary data can be transmitted as a completely separate HTTP request, by adding to (e.g., piggybacking on) an existing request, or encoded into the video file and transmitted as part of the video data. Once uploaded to the content sharing platform, this data is used by the media enhancement component to better inform the enhancement processing applied to the video.

Previous implementations of content sharing platforms and/or social networks do not provide a solution for encoding segment boundary information of a video for improved video processing. For example, one previous solution was for media editing software to take into account segment boundaries when those segments are imported individually. However, this prior solution does not estimate segment boundaries from whole videos and use that information to make decisions. Other prior solutions involved analysis of the video itself, in an attempt to determine the segment boundaries strictly from audio/visual data. This solution inevitably fails in some cases. As such, these previous solutions are not able to use existing enhancement processing to determine segment boundaries while utilizing less computational resource at the content sharing platform.

FIG. 1 illustrates an example system architecture 100, in accordance with one implementation of the disclosure, for splitting content channels of a content sharing platform. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device 110A-110Z includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

The client devices 110A-110Z may also include media editing application 115. Media editing application 115 may be an application that allows users to record, edit, upload, and share media items at the client device 110A-110Z. In some implementations, the media editing application 115 may be a part of media viewer 111, where media viewer 111 provides the functions and features of media editing application 115.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, a user may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a media enhancement component 140. The media enhancement component 140 may apply one or more enhancements to media items 121 of content sharing platform 120. For ease of understanding and clarity, the following description refers to media items 121 as videos in reference to implementations of the disclosure.

For example, video recorded on a mobile device, such as client device 110A-110Z, is often of low quality. This could mean that the resolution is poor, the ISO (International Organization for Standardization) is wrong (hence images are grainy or difficult to see), white balance is incorrect, colors are washed out or poorly balanced, or the video is shaky, to name a few examples. For this reason, the media enhancement component 140 may perform various video enhancements to a video after the video is uploaded to the content sharing platform 120.

As discussed above, the media editing application 115 of a client device 110A-110Z allows users to record, edit, upload, and share media items 121 at the client device 110A-110Z. Some videos which are uploaded to the content sharing platform 120 from the media editing application 115 may have more than one scene. For example, there may be a shot of a dog, then a shot of a stick, then a shot of the dog fetching the stick. This video has three scenes. Implementations of the disclosure may refer to each scene as a "segment" or a "clip."

The enhancements performed by media enhancement component 140 may perform badly on such a video with multiple scenes. For example, a stabilizer algorithm applied by media enhancement component 140 may detect a boundary between two segments as an "unstable event" and attempt to stabilize it, when in fact the stabilizer should not alter video data at the segment boundary. Similarly, two segments may have very different color profiles. In this case, a color correction algorithm applied by media enhancement component 140 may try to even the color balance between segments, when such an action is not actually appropriate.

Implementations of the disclosure improve the performance of server-side enhancement algorithms at the media enhancement component 140 on videos received from a client device 110A-110Z via the media editing application 115. When video is edited in the media editing application 115, segment boundary data is noted. This data is then packaged and transmitted to the content sharing platform 120, before, during, and/or after the video is uploaded. The segment boundary data can be transmitted as a completely separate HTTP request, by piggybacking on an existing request, or encoded into the video file and transmitted as part of the video data. Once on the content sharing platform, this data is used by the media enhancement component 140 to better inform the enhancements applied to the video.

In some implementations, media enhancement component 140 of server 130 and/or media editing application 115 of client device 110A-110Z may interact with content sharing platform 120 and/or with other third party social network servers 150 to provide implementations of the disclosure. Further description of the media enhancement component 140, media editing application 115, and their specific functions are described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
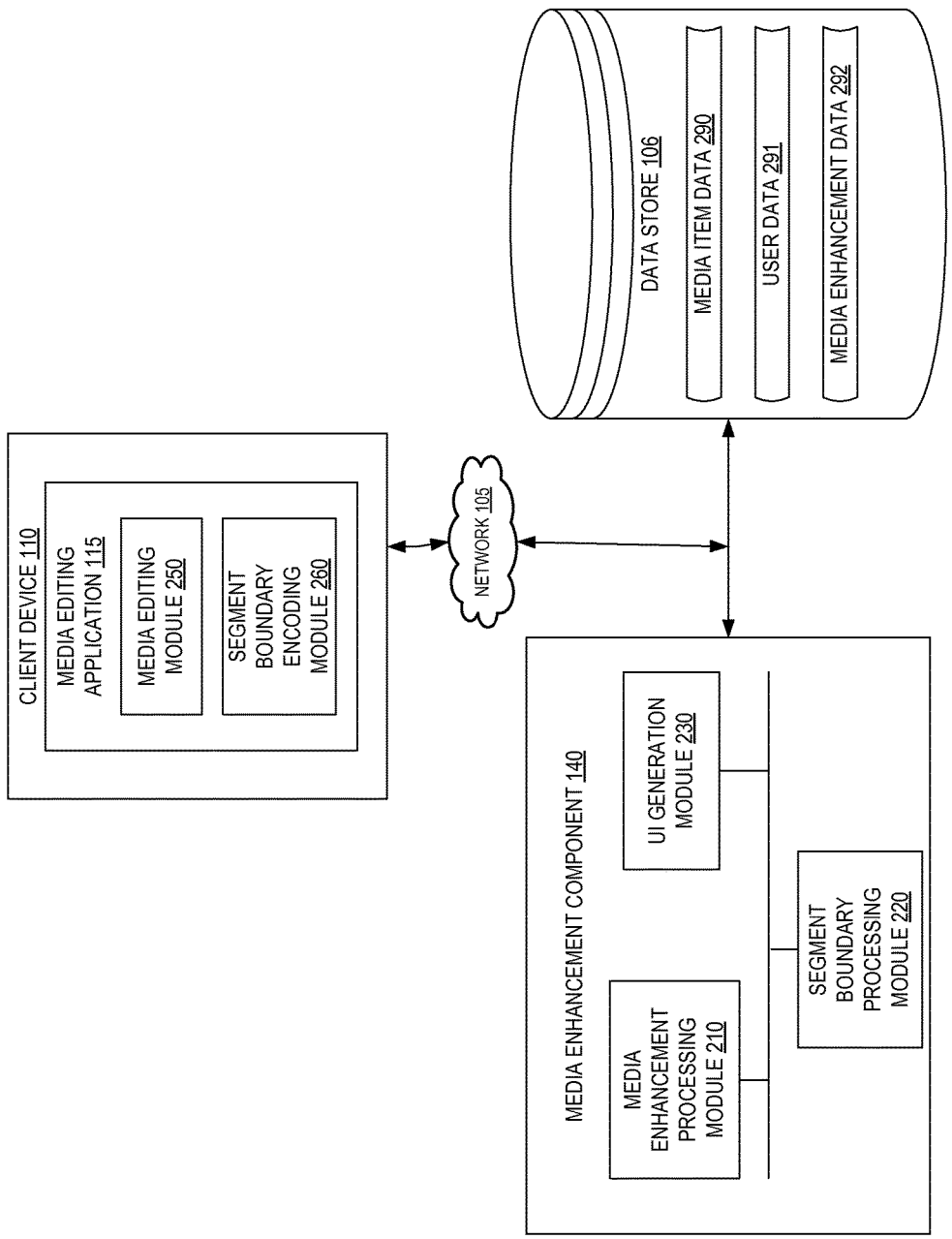
FIG. 2 is a block diagram illustrating a media enhancement component and a media editing application in accordance with one implementation of the disclosure.

FIG. 2 is a block diagram illustrating a media enhancement component 140 and a client device 110 having a media editing application 115 in accordance with one implementation of the disclosure. In one implementation, the media enhancement component 140 includes a media enhancement processing module 210, a segment boundary processing module 220, and a UI generation module 230. In one implementation, the client device 110 includes a media editing application 115. The media editing application 140 includes a media editing module 250 and a segment boundary encoding module 260.

More or less components may be included in the media enhancement component 140 and/or the media editing application 115 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.).

The media enhancement component 140 and the client device 110 are communicatively coupled to the data store 106. For example, the media enhancement component 140 and the client device 110 may be coupled to the data store 106 via a network (e.g., via network 105 as illustrated in FIG. 1). In another example, the media enhancement component 140 may be coupled directly to a server where the media enhancement component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes media item data 290, user data 291, and media enhancement data 292.

As discussed above, the media enhancement component 140 may apply one or more enhancements to media items of content sharing platform. For example, media enhancement processing module 210 may apply various video enhancements to a video after the video is uploaded to the content sharing platform. The various video enhancement algorithms applied by media enhancement processing module 210 may include, but are not limited to, a stabilization algorithm, a color correction algorithm, deblurring, filtering, contrast, dehazing, gamma correction, and so on.

As also discussed above, the media editing application 115 may allow users to record, edit, upload, and share media items from a client device. In some implementations, these videos are uploaded to content sharing platform from the media editing application, and the media enhancement component 140 applies the enhancements to the video. Some videos that are uploaded to the content sharing platform from the media editing application 115 may have more than one scene (also referred to as a "segment" or "clip"). For example, there may be a segment with a dog, then a segment with a stick, and then a segment with the dog fetching the stick. This results in a video with three segments.

The enhancements performed by media enhancement component 140 may perform badly on such a video with multiple scenes. For example, a stabilizer algorithm applied by media enhancement processing module 210 may detect a boundary between two segments as an "unstable event" and attempt to stabilize it, when in fact the stabilizer should leave the segment boundary alone. Similarly, two segments may have very different color profiles. In this case, a color correction algorithm applied by media enhancement processing module 210 may try to smooth a color balance between segments, when such an action is not actually appropriate.

Implementations of the disclosure improve the performance of enhancement algorithms applied by the media enhancement component 140 on videos received from the media editing application 115. A media editing module 250 of the media editing application 115 may edit (e.g., cut, paste, crop, stitch multiple videos together, add graphics, add text, add audio, etc.) a video of the client device. If the video includes multiple segments, the media editing module 250 identifies those segments.

In one implementation, when multiple different videos are stitched together into a single video, the media editing module 250 identifies the segment boundaries as the boundaries between each different stitched video. In other implementations, the media editing module 250 may include logic to detect segment changes in a single video and identify segment boundaries between those segment changes.

The segment boundary processing module 220 then packages and encodes this segment boundary data as part of the video file. This encoded segment boundary data can then be transmitted concurrent with or as part of the video data to the content sharing platform 120 before, during, and/or after the video is uploaded. For example, the data can be transmitted as a completely separate HTTP request, by piggybacking on an existing request, or encoded into the video file and transmitted as part of the video data.

In one implementation, the segment boundary data is encoded as timestamps and placed in a secondary stream of the video file. This secondary stream may be delivered separately, for example as part of a separate HyperText Transport Protocol (HTTP) request to the content sharing platform when the video is uploaded. In another implementation, the secondary stream may be part of a video container file of the video. For example, the segment boundary data can be added to a header at the beginning of the video file. This header may include various metadata regarding the video. An MP4 atom is one example of the video container file.

In some implementations, the segment boundary data is encoded within the video file itself. Various implementations exist for encoding the segment boundary data into the video file. In one implementation, a marker is placed on a single frame that sits between two segments. The marker indicates that the frame is on the segment boundary. The marker may include, but is not limited to a watermark, such as a bar code or QR code. The media enhancement component 140 is configured to look for these markers and understand what they indicate (i.e., segment boundary) when encountered. Other types of indicators may also be placed on a frame at a segment boundary, such as an adjustment of pre-determined pixels of the frame according to a certain color pattern.

In one implementation, instead of incorporating a marker into an existing frame of the video, a new frame is added at the segment boundary. The new frame may include the marker indicating the segment boundary.

In further implementations, an audio track of the video file may be modified to include the segment boundary data. For example, an audio artifact, such as a pitch shift, tone or tone pattern, other frequency modulation, placed at the point in time of the segment boundary in the video may be used to indicate the segment boundary. The media enhancement component 140 may be configured to look for this audio marker and understand that the audio marker indicates a segment boundary in the video.

In another implementation, a list of the segment boundaries in the video is created and encoded at a single location in the video file. For example, a list of segment boundaries in the video, such as the millisecond time marks in the video where the segment boundaries occur, may be encoded into a QR code. This QR code may be placed at any location within the video, such as at the beginning of the video or end of the video. The QR code may be encoded into an existing frame of the video or may be included in a new frame added to the video.

Once the video file with the encoded segment boundary data uploaded to the content sharing platform, the segment boundary data may be used by the media enhancement component 140 to better inform the enhancements applied by the media enhancement processing module 210 to the video. For example, the segment boundary processing module 220 may be configured to understand the type of segment boundary indicators to look for within the video. The segment boundary processing module 220 may then process the segment boundary data to create a list of segment boundaries within the video, and pass this segment boundary data to the media enhancement processing module 210.

The media enhancement processing module 210 may then utilize the segment boundary data to determine when to discard accumulated data for a segment that is being used for its various enhancement algorithms. For example, when the media enhancement processing module 210 is performing color correction, it analyzes the video, collects color data, and maintains a rolling average representation of the colors. The media enhancement processing module 210 may utilize segment boundary data to inform the color correction algorithm when to discard the rolling average data and begin again with the next segment.

In one implementation, the media enhancement component 140 removes any segment boundary markers as part of the video enhancement processing once the segment boundary data has been extracted and incorporated into media enhancement processing. Once the media enhancement component 140 completes the video enhancement processing, the video and media enhancement data may be saved in data store 106 as media item data 290 and media enhancement data 292. Similarly, user data 291 may be updated to indicate that the user uploaded the enhanced video to the content sharing platform.

Figure 3:
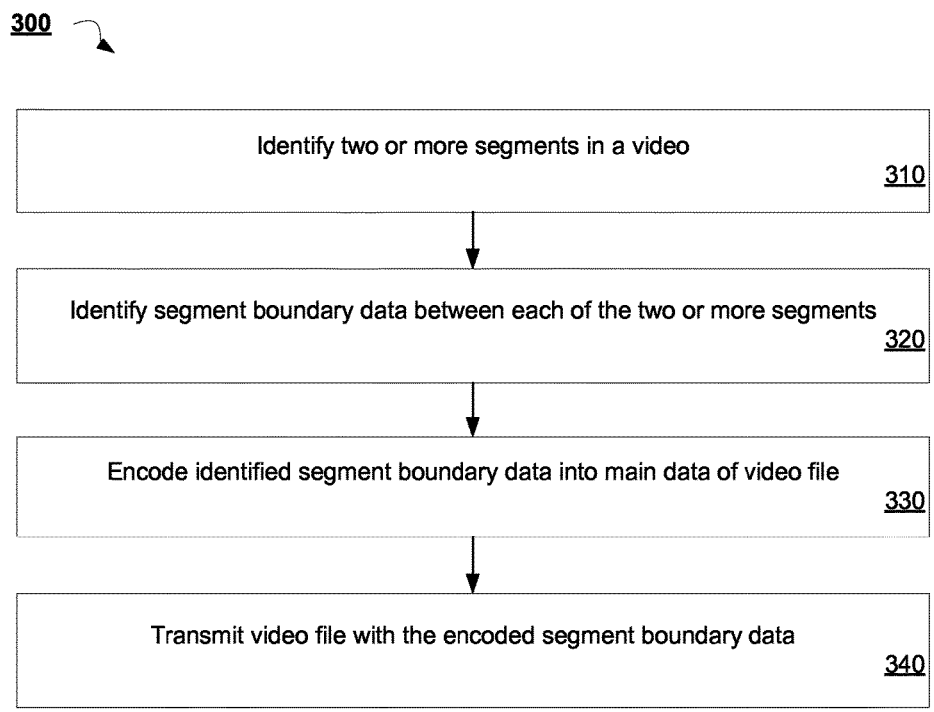
FIG. 3 is a flow diagram illustrating a method for a method for encoding segment boundary information of a video for improved video processing, according to some implementations of the disclosure.

FIG. 3 is a flow diagram illustrating a method 300 for encoding segment boundary information of a video for improved video processing according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by media editing application 115 as shown in FIGS. 1 and 2.

Referring to FIG. 3, method 300 begins at block 310 when two or more segments are identified in a video. In one implementation, a segment of a video may correlate to a single scene in the video. In some implementations, a segment is also referred to as a "clip" of the video. The segments may be identified by a media editing application. For example, the segments may be separate videos that were stitched together by the media editing application. In another example, the media editing application may include logic that detects and identifies segments within a single video. At block 320, segment boundary data between each of the two or more segments is identified. In one implementation, the segment boundary data include a millisecond time mark of the video where a transition between segments occurs.

At block 330, the identified segment boundary data is encoded into the main data of the video file (e.g., the video data). The identified segment boundary data may be encoded as a watermark (e.g., bar code, QR code, pixel pattern, color pattern) that is inserted into an existing frame of the video. In some implementations, the watermark is encoded at the frame that marks each segment boundary. In other implementations, a new frame including the watermark is inserted at each segment boundary.

In further implementations, the audio track corresponding to the video is modified to include segment boundary data. For example, an audio artifact, such as a pitch shift, tone or tone pattern, other frequency modulation, placed at the point in time of the segment boundary in the video may be used to indicate the segment boundary.

In other implementations, a list of the segment boundary data is coded into a QR code, which is placed in an existing frame or a new frame of the video. The frame with the QR code may be placed at any location within the video. Lastly, at block 340, the video file with the encoded segment boundary data is transmitted from the client device. In one implementation, the video file is transmitted to a content sharing platform for uploading. The content sharing platform may then apply media enhancements to the video utilizing the encoded segment boundary data for improved processing.

Figure 4:
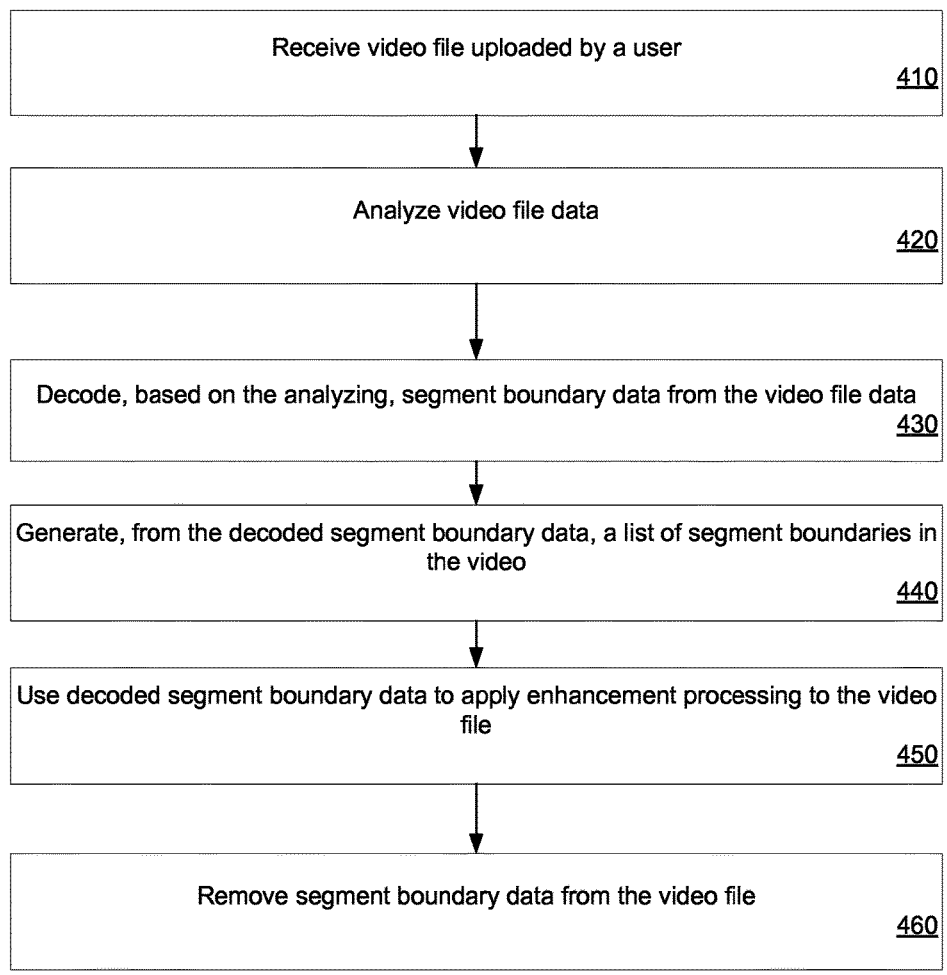
FIG. 4 is a flow diagram illustrating a method for processing a video with encoded segment boundary data, according to an implementation of the disclosure.

FIG. 4 is a flow diagram illustrating a method 400 for processing a video with encoded segment boundary data according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by media enhancement component 140 as shown in FIGS. 1 and 2.

Referring to FIG. 4, method 400 begins at block 410 when a video file uploaded by a user is received at the content sharing platform. In one implementation, the video file is uploaded by the user via a media editing application at the user's device. At block 420, the data of the received video file is analyzed. In one implementation, a media enhancement component of the content sharing platform may perform the analyzing.

At block 430, segment boundary data is decoded from the video file based on the analyzing. The identified segment boundary data may be indicated by a watermark (e.g., bar code, QR code, pixel pattern, color pattern) that is inserted into an existing frame of the video. In some implementations, the watermark is encoded at the frame that marks each segment boundary. In other implementations, a new frame including the watermark is inserted at each segment boundary.

In further implementations, the audio track corresponding to the video indicates the segment boundary data of the video. For example, an audio artifact, such as a pitch shift, tone or tone pattern, other frequency modulation, placed at the point in time of the segment boundary in the video may be used to indicate the segment boundary. In other implementations, a list of the segment boundary data is coded into a QR code, which is placed in an existing frame or a new frame of the video. The frame with the QR code may be placed at any location within the video.

Subsequently, at block 440, a list of segment boundaries in the video is generated from the decoded segment boundary data. Then, at block 450, the decoded segment boundary data is used to apply enhancement processing to the video file. In one implementation, the segment boundary data can be used to determine when to discard accumulated data for a segment, where the accumulated data is being used for various enhancement algorithms. For example, a color correction enhancement is being performed, color data of the video is analyzed and collected, and a rolling average representation of the colors is maintained. The segment boundary data may be utilized in this case to inform the color correction algorithm when to discard the rolling average data and begin again with the next segment.

Lastly, at block 460, the segment boundary data is removed from the video file. For example, segment boundary watermarks or QR codes may be removed from the video, or the audio track may be modified to remove the segment boundary indicator audio.

Figure 5:
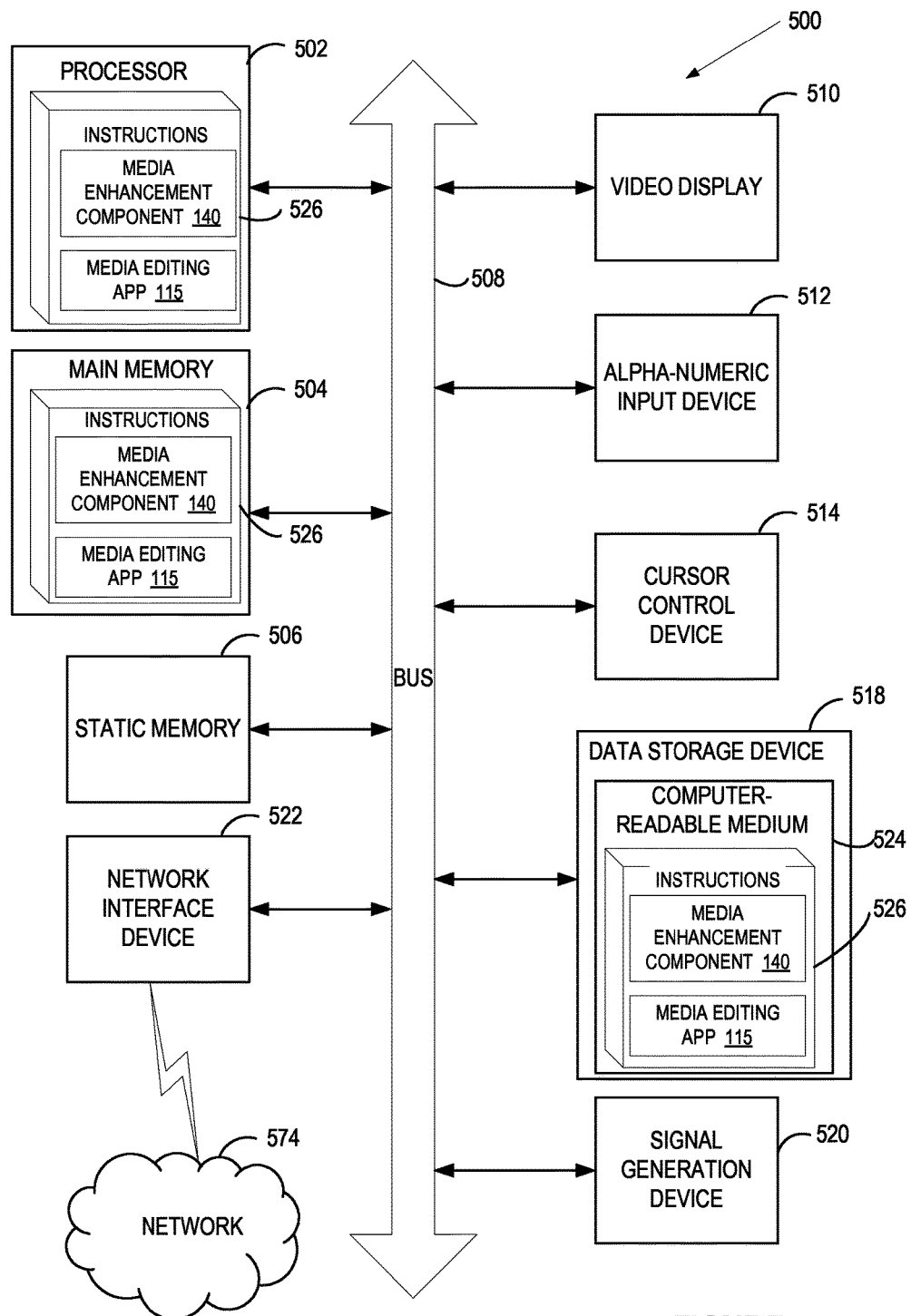
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one implementation, the instructions 526 include instructions for a media enhancement component 140 and/or a media editing application 115, which may correspond, respectively, to their identically-named counterparts described with respect to FIGS. 1 and 2, and/or a software library containing methods for encoding segment boundary information of a video for improved video processing. While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or".

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, by a processing device of a client device, segments of a video, the identifying performed by a media editor application of the client device without user intervention;
   inserting, by the processing device of the client device, boundary data encoded in the video, wherein each of the segments of the video is associated with a corresponding boundary data, and wherein inserting the boundary data further comprises:
      for each frame of the video at a beginning of a segment boundary, adjusting determined pixels of the frame to indicate a start of the segment boundary while keeping pixels of other frames in the segment in an unadjusted state; and
   transmitting, by the processing device of the client device, the video comprising the encoded boundary data to a server.

2. The method of claim 1, wherein inserting the boundary data further comprises generating, for each pair of the segments, a single frame between the pair of segments, the single frame comprising a marker that indicates that the single frame is on a segment boundary.

3. The method of claim 1, wherein adjusting the determined pixels comprises inserting a pattern on pixels of the frame to indicate the start of the segment boundary.

4. The method of claim 1, wherein adjusting the determined pixels comprises inserting a color shift on pixels of the frame to indicate the start of the segment boundary.

5. The method of claim 1, wherein adjusting the determined pixels comprises inserting a watermark on pixels of the frame to indicate the start of the segment boundary.

6. The method of claim 1, wherein inserting the boundary data further comprises adding a tone in an audio track of the video at the segment boundary.

7. The method of claim 1, wherein inserting the boundary data further comprises adding a tone pattern in an audio track of the video at the beginning of the video, the tone pattern to indicate locations of the segments in the video.

8. The method of claim 1, wherein the server receives the video with the encoded boundary data and processes the encoded boundary data to utilize in video enhancements applied to the video.

9. The method of claim 1, wherein inserting the boundary data further comprises altering pixels of a frame at the beginning of the video, the altered pixels to indicate locations of the segments in the video.

10. The method of claim 1, wherein inserting the boundary data further comprises incorporating timestamps representing the boundary data in a container file of the video.

11. An apparatus comprising:
a display device;
a memory communicably coupled to the display device; and
a processing device communicably coupled to the memory, the processing device to execute instructions to:
identify, without user intervention, segments of a video generated by the apparatus, the identifying performed by a media editor application executed by the processing device;
insert boundary data encoded in the video, wherein each of the segments of the video is associated with a corresponding boundary data, and wherein inserting the boundary data further comprises:
for each frame of the video at a beginning of a segment boundary, adjusting determined pixels of the frame to indicate a start of the segment boundary while keeping pixels of other frames in the segment in an unadjusted state; and
transmit the video comprising the encoded boundary data to a server.

12. The apparatus of claim 11, wherein the boundary data further comprises the processing device to generate, for each pair of the segments, a single frame between the pair of segments, the single frame comprising a marker that indicates that the single frame is on a segment boundary.

13. The apparatus of claim 11, wherein adjusting the determined pixels further comprises the processing device to insert a pattern on pixels of the frame to indicate the start of the segment boundary.

14. The apparatus of claim 11, wherein adjusting the determined pixels further comprises the processing device to insert a color shift on pixels of the frame to indicate the start of the segment boundary.

15. The apparatus of claim 11, wherein adjusting the determined pixels further comprises the processing device to insert a watermark on pixels of the frame to indicate the start of the segment boundary.

16. The apparatus of claim 11, wherein inserting the boundary data further comprises the processing device to add a tone in an audio track of the video at the segment boundary.

17. The apparatus of claim 11, wherein inserting the boundary data further comprises the processing device to add a tone pattern in an audio track of the video at the beginning of the video, the tone pattern to indicate locations of the segments in the content item.

18. The apparatus of claim 11, wherein inserting the boundary data further comprises altering pixels of a frame at the beginning of the video, the altered pixels to indicate locations of the segments in the video.

19. A non-transitory machine-readable storage medium storing instructions which, when executed, cause a processing device to perform operations comprising:
receiving, by the processing device of a server device, a video file uploaded by a client device associated with a user, the video file comprising segment boundary data identified by a media editor application of the client device without user intervention and inserted into the video file as encoded boundary data at the client device, wherein the segment boundary data comprises adjustment of determined pixels of the frame to indicate a start of the segment boundary while keeping pixels of other frames in a segment corresponding to the segment boundary in an unadjusted state;
decoding, by the processing device, segment boundary data from the video file, the segment boundary data encoded with video data of the video file, wherein each segment of the video file is associated with a corresponding one of the segment boundary data; and
using, by the processing device, the decoded segment boundary data to apply enhancement processing to the video file.

20. The non-transitory machine-readable storage medium of claim 19, wherein the segment boundary data comprises a single frame between each pair of segments of the video, the single frame comprising a marker file that indicates that the single frame is on a segment boundary.

21. The non-transitory machine-readable storage medium of claim 19, wherein adjustment of the determined pixels comprises a pattern on pixels of the frame to indicate the start of the segment boundary.

22. The non-transitory machine-readable storage medium of claim 19, wherein adjustment of the determined pixels comprises a color shift on pixels of the frame to indicate the start of the segment boundary.

23. The non-transitory machine-readable storage medium of claim 19, wherein adjustment of the determined pixels a watermark on pixels of the frame to indicate the start of the segment boundary.

24. The non-transitory machine-readable storage medium of claim 19, wherein segment boundary data comprises a tone in an audio track of the video file at a segment boundary.

25. The non-transitory machine-readable storage medium of claim 19, wherein the encoded boundary data is inserted in the video file by altering pixels of a frame at the beginning of the content item, the altered pixels to indicate locations of the segments in the content item.

* * * * *